United States Patent Office 3,347,921
Patented Oct. 17, 1967

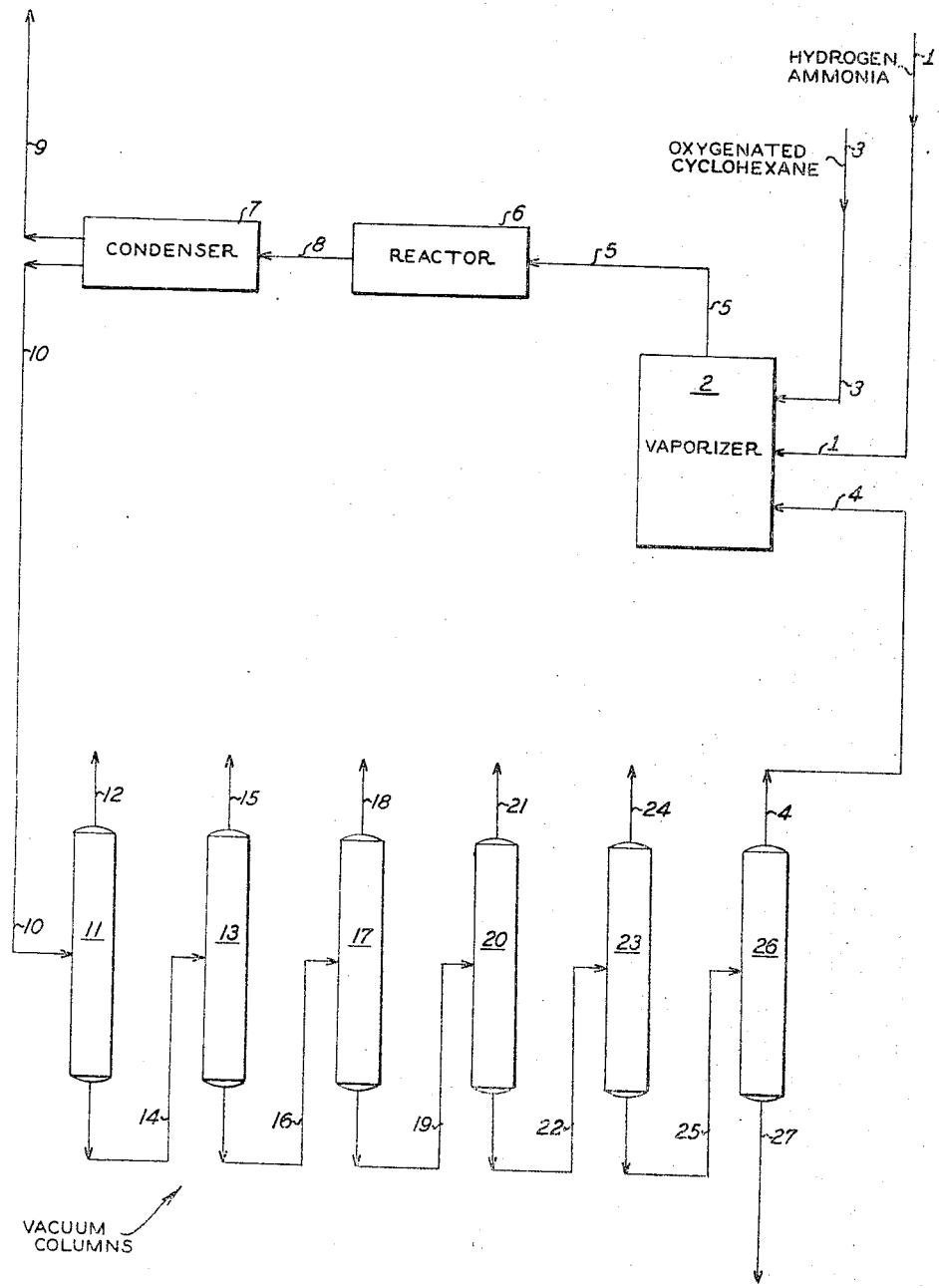

3,347,921
PREPARATION OF ANILINES FROM OXYGENATED CYCLOHEXANES
Robert V. Carrubba, Yonkers, N.Y., and Richard L. Golden, Teaneck, N.J., assignors to Halcon International, Inc., a corporation of Delaware
Filed Apr. 6, 1964, Ser. No. 357,585
5 Claims. (Cl. 260—581)

This invention relates to a new and improved process for the preparation of aniline from oxygenated cyclohexane compounds, such as cyclohexanol. More specifically, this invention relates to a recycle technique which increases the overall yield of aniline obtained.

In the preparation of aniline, many high boiling by-products are formed. The by-products are of considerably less value than aniline and therefore their production is a serious economic drawback.

In accordance with this invention it has been found that by properly distilling the by-product high boiling material and recycling a defined distillate, the overall yield of aniline can be markedly increased, and, of course, the overall by-product formation minimized. The result obtained by the invention is particularly surprising, since the recycle of all of the by-products, without the application of the selective distillation step of the invention, results in a detrimental build-up of these high boiling materials in the system, and the eventual cessation of economic aniline production.

FIGURE 1 illustrates an overall flow sheet of the process of the invention.

A mixture of cyclohexanone-cyclohexanol is passed via line 1 into vaporizer 2. Ammonia and hydrogen are passed into vaporizer 2 via line 3 and recycled materials via line 4. The vaporized material passes via line 5 to reactor 6 maintained at a temperature of 315° C. and a pressure of 50 p.s.i. A platinum on silica catalyst is used and a liquid hourly space velocity of about 0.5. The oxygenated cyclohexane materials react with the ammonia to produce aniline, cyclohexylamine, and high boiling materials. This reaction product, along with unreacted materials and hydrogen, are passed to condenser 7 via line 8. The bulk of the hydrogen and ammonia is removed via line 9, separated, and the ammonia recycled. The condensed material passes via line 10 to the ammonia stripper 11. Residual ammonia is removed overhead and recycled via line 12. The bottoms fraction from the stripper 11 is passed to the drying column 13 via line 14. Water and other lower boiling materials are removed via line 15. After the removal of the ammonia and water, the organic material is subjected to a series of distillations. The bottoms fraction from the drying column 13 passes via line 16 into the cyclohexylamine column 17. About 81 parts of cyclohexylamine are removed overhead via line 18. This material may be retained as products, or, if desired, recycled to the vaporizer. The bottoms stream passes via line 19 to cyclohexanol column 20, and about 20 parts of unreacted cyclohexanol and cyclohexanone are removed overhead via line 21. These materials, of course, may be recycled to the vaporizer. Leaving the cyclohexanol column 20 the bottoms fraction passes to the aniline column 23 via line 22. This column serves to remove the aniline product overhead via line 24. The high boiling materials are removed via line 25 and contain a broad spectrum of materials such as an aniline-phenol azeotrope, dicyclohexylamine, phenylcyclohexylamine, Schiff bases of aniline and cyclohexylamine, and diphenylamine. As set forth previously, if this stream is recycled there is a buildup of undesirable materials to the detriment of the overall process. In accordance with the invention the bottoms fraction passes to the distillation column 26. Only the materials removed overhead are recycled via line 4 to the vaporizer 2. The bottoms fraction, removed via line 27 is discarded amounting to about 18 parts. The following table shows the operating conditions of the columns illustrated in the figure:

TABLE 1

| Column | Bottoms Temp., °F. | Pressure, mm. Hg |
|---|---|---|
| Ammonia Stripper 11 | 400 | *125 |
| Drying Column 13 | 335 | 250 |
| Cyclohexylamine Col. 17 | 313 | 100 |
| Cyclohexanol Col. 20 | 325 | 100 |
| Aniline Column 23 | 325 | 100 |
| Heavy Ends, Col. 26 | 400 | 25 |

*P.s.i.g.

While the above flowsheet illustrates a preferred embodiment of the instant invention many modifications will be obvious to those skilled in the art. For example the distillation of the organic materials may be done in any desired sequence. Thus, in a process for the production of aniline only, the cyclohexylamine and cyclohexanol columns can be combined and the entire overhead product recycled.

In the conversion of oxygenated cyclohexanes, i.e., cyclohexanol and cyclohexanone and mixtures thereof, to aniline the following reaction conditions are employed:

| | Broad | Preferred |
|---|---|---|
| Temperature, °C | 250–500 | 285–350 |
| Pressure, p.s.i.a. | 10–1000 | 15–300 |
| Oxygenated cyclohexane, mole percent | 0.2–25 | 2–15 |
| Hydrogen, mole percent | 5–80 | 10–50 |
| Ammonia, moles/mole of oxygenated cyclohexane | 0.5–40 | 2–20 |

Preferably, metals of Group VIII of the Periodic Table such as metals of the platinum group, as well as cobalt and nickel, copper, molybdenum, chromium or mixtures thereof can also be used as the dehydrogenation catalyst. Although best yields are obtained using a catalyst supported on neutral materials, such as carbon, silica, silicon carbide or alpha-alumina of the porous type, good yields can be obtained by using those catalysts on acidic supports such as silica-aluminas. Self-supporting catalyst such as the "foraminates" may be employed. These catalysts are described in detail in Groggins, Unit Processes in Organic Synthesis, McGraw-Hill Book Co., Inc. (New York) 1958, vol. 5, pages 434–438. Particularly high yields of aniline can be obtained by controlling the acidity of the catalyst. Highly acidic catalysts result in less attractive yields of aniline. Preferably, the pH of the catalyst should be greater than 5. A pH range of 5 to 9 is most desirable. The acidity of the catalyst may be reduced by any convenient procedure, e.g., soaking in 0.1 N NaOH or other alkali or alkaline earth metal base.

The particular fraction which is recycled may be characterized by its boiling point. A substantial portion of this material has a boiling point of less than 400° C. at 25 mm.

The following examples illustrate the advantage of the instant invention.

*Example 1*

In the procedure outlined above 1360 parts of ammonia and 80 parts of hydrogen for each 1000 parts by weight of cyclohexanol are fed to the reactor. About 194 parts of recycle are also added.

Among the products of the reaction are unreacted material, 1190 parts ammonia and 30 parts of cyclohexanol; a total of 190 parts of hydrogen and 175 parts of water; and 207 parts of high boiling material. As product, 788 parts of aniline and 104 parts of cyclohexylamine are produced.

The 207 parts of high boiling material is distilled at 400° C. 25 mm. Hg. 194 parts of material are obtained overhead, and as set forth above recycled to the reactor. The 13 parts of residue are discarded. Based on the cyclohexanol feed, the yield of aniline and cyclohexylamine is 95%.

*Example 2*

Using the same feed as in Example 1, with the exception that the recycle stream is eliminated, only 722 parts of aniline and 96 parts of cyclohexylamine are obtained. This is a yield decrease of about 7%.

The above examples clearly point out the advantage of recycling the specifically defined high boiling stream set forth in the invention. That significant values can be recovered from this recycle stream without interferring with the overall process is of great economic importance.

In view of the foregoing disclosures, variations and modifications thereof will be apparent to one skilled in the art, and it is intended to include within the invention all such variations and modifications except as do not come within the scope of the appended claims.

What is claimed is:

1. A process for the preparation of aniline by dehydrogenative amination which comprises heating a mixture comprising from 0.2 to 25 mole percent of cyclohexanol, from 5 to 80 mole percent of hydrogen and from 0.5 to 40 mole percent of ammonia at temperatures of from 250° C. to 500° C. and at pressures of from 10 to 1000 p.s.i.a., thereby forming a mixture containing aniline and heavy ends, treating said mixture to recover aniline, separating from the heavy ends after recovery of aniline a fraction having a boiling point of less than 400° C. at 25 mm. Hg, and recycling at least a portion of the fraction.

2. A process according to claim 1 wherein the cyclohexanol is obtained by oxygenating cyclohexane.

3. A process according to claim 1 wherein cyclohexanol is a constituent of an oxygenated cyclohexane mixture.

4. A process according to claim 1 wherein the fraction having a boiling point of less than 400° C. at 25 mm. Hg is separated by fractionation.

5. A process according to claim 1 wherein all of the fraction having a boiling point of less than 400° C. at 25 mm. Hg is recycled.

References Cited

UNITED STATES PATENTS 2,974,168  3/1961  Sharp et al. _____ 260—57
3,219,704  11/1965  Wilder et al. _____ 260—578 X CHARLES B. PARKER, *Primary Examiner.*

JOSEPH P. BRUST, *Examiner.*

ROBERT V. HINES, *Assistant Examiner.*